June 9, 1942.     H. W. COWIN     2,285,496
BLOWPIPE
Original Filed Nov. 29, 1938    2 Sheets-Sheet 1
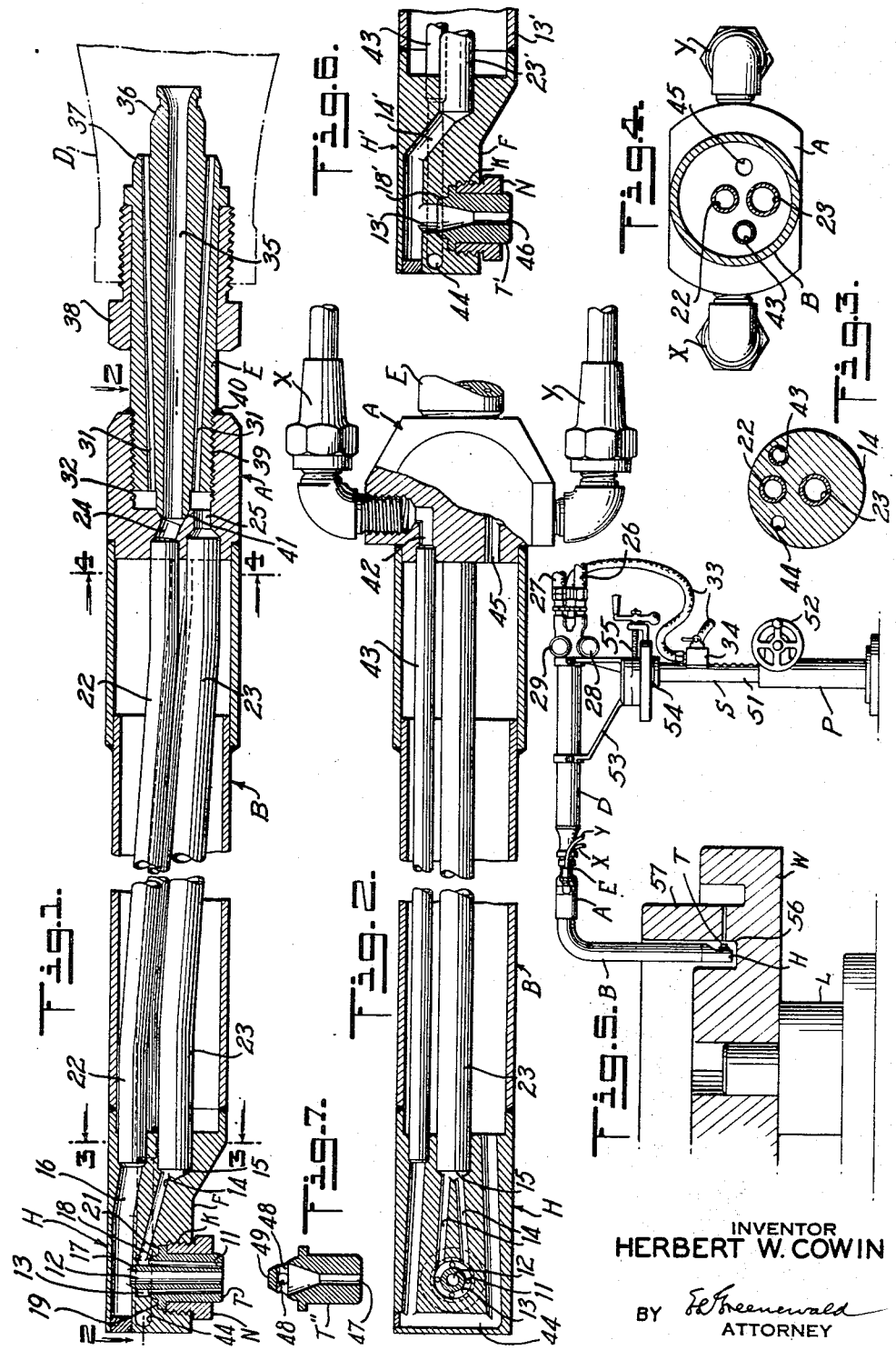
INVENTOR
HERBERT W. COWIN
BY *E. W. Greenewald*
ATTORNEY June 9, 1942.  H. W. COWIN  2,285,496
BLOWPIPE
Original Filed Nov. 29, 1938   2 Sheets-Sheet 2
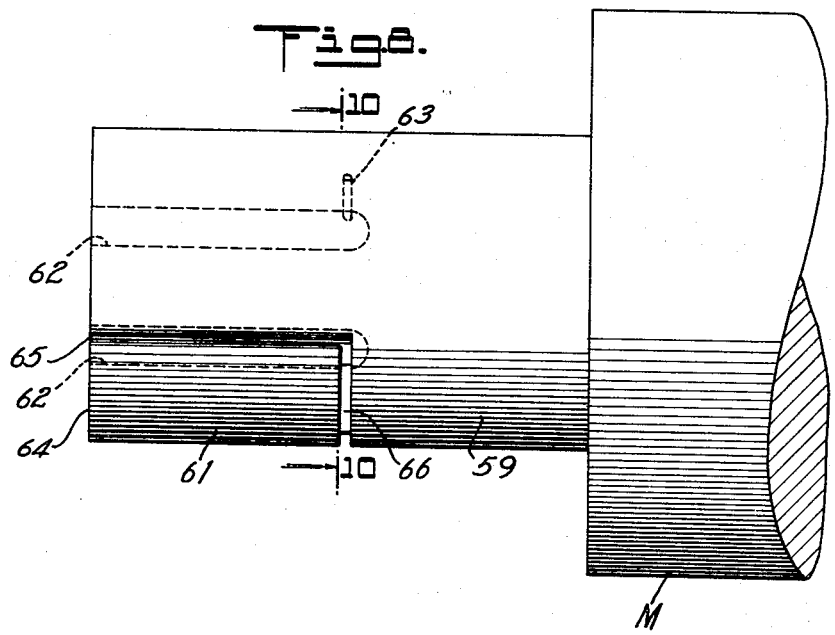
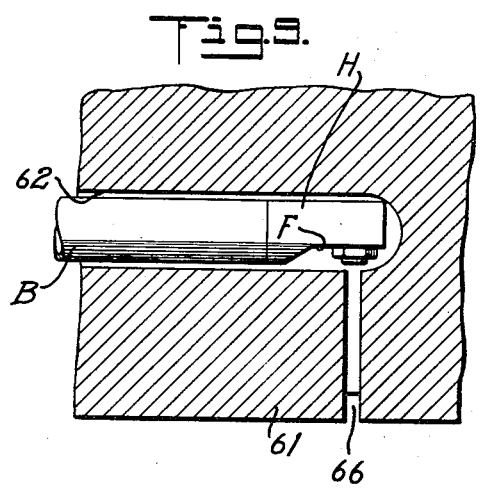
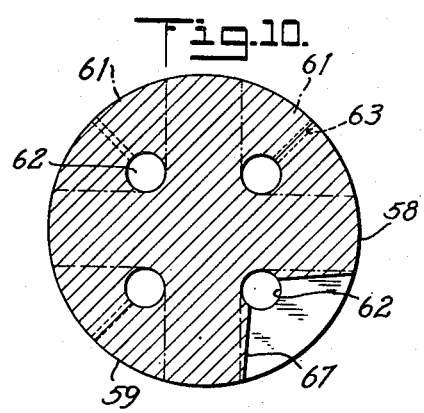
INVENTOR
HERBERT W. COWIN
BY *ED Greenewald*
ATTORNEY Patented June 9, 1942

2,285,496

UNITED STATES PATENT OFFICE 2,285,496

BLOWPIPE

Herbert W. Cowin, Westfield, N. J., assignor to The Linde Air Products Company, a corporation of Ohio Original application November 29, 1938, Serial No. 242,882. Divided and this application November 4, 1939, Serial No. 302,829

5 Claims. (Cl. 158—27.4)

This invention relates to an improved oxy-gas cutting blowpipe especially useful in cutting portions from metal members, and for operating in ordinarily inaccessible localities. This application is a division of application Serial No. 242,882, filed November 29, 1938, now Patent No. 2,209,682.

Heretofore, in the practice of oxy-gas cutting of metal members, it has been customary to direct the cutting oxygen jet against an easily accessible outside surface of the metal member so as to begin the cut at said surface, and then to advance the cut from said surface into, and usually entirely through the member being cut. For example, in severing a steel plate, an oxy-gas cutting medium (a preheating flame and an oxidizing jet) is directed against one surface of the plate, whereupon metal oxidation starts at said surface and progresses through the plate to its opposite surface. Then, by moving the cutting medium relatively to the plate and along the outside line of cutting, a kerf is produced and a portion is severed from the plate.

The procedure just described is impracticable in certain fields of metal fabrication, for example, when it is desired to cut a piece or section from a massive metal body but where the kerf does not extend entirely through the body. In such shaping operation, if the oxy-gas cutting stream is projected inwardly from the outside surface but only part way through the body, it is practically impossible to produce a uniform cut of predetermined depth; unsatisfactory blowpipe operation and undercut surfaces result; and molten metal, slag and products of combustion usually are blown and driven into the surfaces of the kerf. In certain other metal fabricating operations which require the severing of a piece from a metal body, especially where the line of cutting is practically inaccessible, prior oxy-gas cutting methods and equipment are also inadequate. Similarly it is often desirable to perform welding, heat-treating or related metallurgical operations in locations inaccessible to previously available equipment.

The principal objects of the present invention are to provide improved oxy-gas cutting equipment adapted to successfully perform the cutting, welding, shaping and like operations discussed in the next preceding paragraph; and to provide an oxy-gas blowpipe having a tip-carrying member which may be inserted into a deep or narrow cavities and other practically inaccessible recesses to direct an oxy-gas cutting or heating medium against the side walls of such cavities or recesses. These and other objects and the principles and novel features of the invention will become apparent from the following description and the accompanying drawings, in which:

Fig. 1 is a view, partly in longitudinal section and partly in side elevation, illustrating an improved oxy-gas cutting blowpipe embodying this invention;

Fig. 2 is a view similar to Fig. 1, but taken on line 2—2 of Fig. 1;

Figs. 3 and 4 are sectional views taken on the lines 3—3 and 4—4, respectively, of Fig. 1; Fig. 3 showing the arrangement of the passages entering the blowpipe head and Fig. 4 showing the arrangement of the passages in the inlet block of the blowpipe;

Fig. 5 is a view illustrating cutting apparatus embodying this invention, and part of an annular metal body set in position to have a portion severed therefrom;

Fig. 6 is a sectional view of the delivery end of a welding and heat-treating blowpipe incorporating features of the present invention;

Fig. 7 is a sectional view of a welding tip that may be substituted for the cutting tip disclosed in assembled position in Fig. 1;

Fig. 8 is a side view of the wobbler end of a steel roll, showing a portion of said end partly cut out by the improved blowpipe, to provide a spline;

Fig. 9 is an enlarged detail section of Fig. 8, showing a part of the cutting blowpipe of Figs. 1 and 2 within a starting hole and in position to shape the wobbler; and Fig. 10 is a sectional view on the line 10—10 of Fig. 8, showing the starting holes in the roll and also showing one wobbler quadrant cut out.

As best shown in Figs. 1 to 4 of the drawings, the improved blowpipe comprises an elongated hollow casing or tubular body B carrying a blowpipe head H at one end and an inlet block A at its other end. Body B and head H desirably are cylindrical in cross-section and of substantially the same outside diameter, except that the head H has one side recessed or cut away to provide an inwardly offset lateral face F which is substantially parallel to the common axis of the head and body. The head H may be of solid copper and has a threaded cavity K opening vertically into the face F at one end of the head to receive both a cutting nozzle or tip T and a hollow nut N, the latter having threads engaging those in the cavity to gas tightly but removably secure the tip T to the head H. In order that the blowpipe shall be capable of cutting in very close quarters, especially outwardly from the inside of a narrow or deep recess, no part of the tip T or head H projects radially outwardly beyond the extended circumference or axially projected periphery of the tubular body B. The tip T is therefore considerably shorter than those used on conventional cutting blowpipes; but it has similar longitudinal passages 11 for discharging combustible gas to provide a heating flame, also a central passage 12 for discharging an oxygen cutting jet in a direction perpendicular to the face F and to the axis of the blowpipe body B.

The combustible or preheating gas, which may be a mixture of oxygen and acetylene, is distributed to the passages 11 from a chamber 13 in the cavity K, which chamber may communicate at opposite sides thereof with two passages 14 drilled in the head H and opening into a single inlet 15. Another passage 16 in the head delivers cutting oxygen to the inner end of the tip passage 12. Suitable gas tight seats 17 and 18 in the cavity K cooperate with similar seats on the tip T to prevent leakage between the chamber 13 and the passage 16, and from the chamber 13 into the atmosphere. The hollow nut N may engage an annular flange 19 on the tip T to hold the latter tightly in the cavity K, with the inner surface of the flange 19 bearing gas-tightly against an annular shoulder 21 within the cavity.

The cutting oxygen and the preheating mixture may be supplied to the head H, and their flow may be controlled, by any suitable or well known means, except that the control means must be located far enough back from the head H to prevent interference with the insertion of the blowpipe into a deep or narrow recess in a metal member. As shown, pipes 22 and 23, respectively, conduct oxygen to the passage 16 and a combustible gas to the passages 14; and these pipes extend through the hollow body B and communicate respectively with passages 24 and 25 in the inlet block A. As illustrated in Fig. 5, for example, the main part of a conventional machine cutting blowpipe D, generally similar in construction to the one disclosed in U. S. Patent No. 2,108,820, may be used to supply and control oxygen and acetylene to provide the preheating gas mixture and the cutting oxygen discharged from the tip T. A suitable adaptator E may replace the conventional nozzle or stem of the blowpipe D while gas-tightly coupling the outlet end of the latter to the inlet block A. Hoses 26 and 27 deliver oxygen and acetylene through shut-off and mixture-adjusting valves 28 and 29, respectively, to a suitable gas mixer (not shown) in the blowpipe D, and the combustible mixture thus produced is discharged through passages 31 in the adaptor E and into a chamber 32 in the block A. From the chamber 32 the mixture flows through the pipe 23 and passages 14 to the preheating gas passages 11 in the tip T. A branch cutting-oxygen passage (not shown) receives oxygen from the hose 33 and through the valve 34; and this branch passage communicates with a central passage 35 in the adaptor E, the flow of such cutting oxygen being controlled by the cutting oxygen valve 34.

The adaptor E is provided with conventional conical seating surfaces 36 and 37 at its inlet end to mate with corresponding seats (not shown) in the head of the cutting blowpipe D, the adaptor E being held securely in position by a coupling nut 38 in the same manner as an ordinary cutting nozzle. The forward end of the adaptor E is threaded for connection with a threaded bore 39 in the inlet block A, the joint being made sufficiently tight that a forwardly projecting seating surface 41 seals the passage 24 from the chamber 32. A deposit of solder 40 or the like, provides a gas-tight seal between the chamber 32 and the atmosphere.

The heat incidental to and generated during operation of the blowpipe requires adequate cooling of the head H and body B in order that the cutting or welding operation may proceed satisfactorily while said head and body are confined in a deep or narrow recess and while subjected to the very high temperatures therein. As best shown in Fig. 2, a cooling medium such as water may be supplied through an inlet fitting X to a duct 42 in the inlet block A. A pipe 43, which extends through the hollow body B, connects the duct 42 to one branch of U-shaped passage 44 formed in the head H around the axis of the cavity K. The discharge branch of the U-passage opens into the interior of the body B which is connected by a duct 45 in the block A to an outlet fitting Y. Thus, cooling water may be circulated through the pipe 43, and around the head H, returning through the hollow body B where it courses around the outside of water pipe 43 and gas pipes 22 and 23, thereby thoroughly cooling all parts of the blowpipe which are inserted into and subjected to the heat developed within a deep or narrow recess.

Fig. 6 discloses the manner in which principles of the present invention may be incorporated in an improved welding or heating blowpipe. The same general construction is employed with the exception that a welding tip T', having a single heating-gas orifice 46, is secured within the head H'. An oxy-acetylene mixture is delivered to the orifice 46 through a pipe 23', passage 14', and chamber 13' as shown in Fig. 6. A conical seat 18' formed in the head H' engages a corresponding seat to seal the chamber 13' from the atmosphere, the tip T' being held in position within the cavity K by a hollow nut N, as previously described. Suitable provision is made for securing the body B' to the head of a conventional welding blowpipe (not shown) by means of an adaptor of the general type shown in Fig. 1, in order that the inflammable mixture, normally discharged from such welding blowpipe, may be conducted to the pipe 23'. Under these circumstances no provision is made for cutting gas, the blowpipe functioning solely as a heating or welding implement.

If desired, the blowpipe shown in Fig. 1 may be employed for welding and heating operations by shutting off the supply of cutting oxygen. In order to more properly concentrate the flame, however, and to insure against accidental flow of cutting oxygen, a tip T'', of the type shown in Fig. 7 may be employed with the cutting blowpipe shown in Fig. 1, to adapt it for welding and heating purposes. The tip T'', comprises a body adapted to be held within the cavity K by the nut N, which body is provided with a central heating-gas orifice 47 communicating through openings 48 with the chamber 13. A plug 49 engages the conical seat 17 of the head H effectively blocking the flow of cutting oxygen even though the cutting-oxygen valve is open. Accordingly, with the tip T'' in position, the blowpipe of Fig. 1 functions as a welding blowpipe. Obviously similar tips with larger or smaller delivery orifices may be employed to alter the capacity of the blowpipe.

The manner in which the improved blowpipe may be employed for use in inaccessible locations, and for performing cutting operations wherein the kerf projects only partly through a complete body section, is disclosed in Figs. 5, 8, 9, and 10. In Fig. 5, the improved blowpipe body B, bent to form a right angle is shown supported by a suitable pedestal P while cutting the riser from a large casting. A support S, provides for vertical adjustment with respect to the pedestal P, and preferably comprises a telescoping shaft 51 which may be raised and lowered by rack and pinion elevating means 52. Blowpipe clamping means 53 is mounted to the shaft 51 by a swivel connection 54, and a transverse slide 55 is provided for making lateral adjustments. The head of the blowpipe body B is shown inserted in the narrow, inaccessible, and relatively deep recess 56 of a workpiece W, for example, a cast wheel, in order to cut through the adjoining massive riser 57, formed during the casting operation. The Wheel W is supported by a turntable L adapted to provide relative movement along the path of cut between the work W and the blowpipe body B.

With the blowpipe mounted as shown in Fig. 5, a starting zone on the riser 57 is heated to the ignition temperature by the preheating jets from the tip T, after which the work is pierced by a relatively light stream of cutting oxygen admitted through the tip T by partially opening the valve 34. Upon completion of the piercing operation, a full stream of cutting oxygen is applied, and relative movement between the work W and the blowpipe B instituted by rotating the turntable L at the proper speed to maintain a cut. By mounting the blowpipe body B upon the carriage of a machine of the type shown in U. S. patent to H. W. Jones, No. 2,054,425, straight line cutting operations may be similarly performed in elongated relatively inaccessible recesses or the like.

Referring now to Figs. 8, 9, and 10, the improved blowpipe body B is shown performing a cutting operation in connection with the formation of splines 58 upon the driving or wobbler end 59 of a mill roll M, such rolls being cast in large sizes for rolling structural shapes, etc., in steel mills. In order to properly connect the roll M with a source of driving power, one or both ends is ordinarily splined by removing quadrants 61, indicated by broken lines in Fig. 10. Heretofore the quadrants were removed at great expense by slow machining and grinding operations. The quadrants are successively removed by progressively projecting an oxidizing jet from the improved blowpipe outwardly from longitudinally extending bores 62, best seen in Fig. 10.

Preferably, though not necessarily, small sighting holes 63 are first drilled radially inward from four points symmetrically located about the periphery of the wobbler end 59 at the desired distance from the end face 64 of the roll M. A plurality of longitudinally extending bores or starting holes 62 are then progressively extended inwardly from the end face 64 in a direction parallel to the roll axis until the proper depth has been reached as determined with the aid of the sighting holes 63. Although the bores 62 may be formed by drilling and reaming or similar machining operations, preferably use is made of a conventional oxygen lance, which is highly adapted for rapidly forming deep cylindrical bores of the type shown, preferably of a diameter slightly in excess of the diameter of the extended body B. With the bores 62 located substantially at the apices of the sectors to be removed, as shown in Fig. 10, the respective quadrants 61 may be removed by inserting the blowpipe body B within each bore and making the required circuitous oxidizing gas cut outwardly from the bore to the periphery of the wobbler end, in order to sever the quadrant from the roll.

Satisfactory results have been obtained by starting the severing cut at the face of the roll 64, that is, at the mouth of the bore, with the tip T pointing outwardly so as to project the cutting stream in a substantially horizontal direction outwardly from the bore to the periphery of the wobbler end 59. The blowpipe body B is then moved slowly lengthwise of the bore so as to form the kerf 65, as shown in Fig. 8, the inward motion being stopped when the head of the blowpipe body reaches the bottom of the bore, as shown in Fig. 9. The transverse end cut may then be made by providing relative rotary or arcuate motion between the roll M and the blowpipe body, such as might be obtained by turning the blowpipe body approximately 90° about the axis of the bore, after which the flame-cutting jet issues in a vertical direction from the tip T. The severing operation is completed by slowly withdrawing the blowpipe body from the bore 62 while progressively forming the vertical cut, resulting in the face 67. Fig. 10 illustrates the wobbler end after the completion of one severing cut, effecting the removal of the lower right-hand quadrantal sector. The operation is repeated until all desired sectors are removed, after which the wobbler may be finished by machining the cut portions to the shape illustrated in dot and dash lines in Fig. 10.

Alternatively, the operation may be performed by initiating the severing cut at the position shown in Fig. 9, by projecting the flame-cutting jet through the sighting hole 63, turning the blowpipe body 45° so that the jet issues either horizontally or vertically, and slowly withdrawing the blowpipe body B from the bore 62 to form the longitudinal cut. The body B must then be inserted within the bore a second time to perform the remaining half of the severing operation. In either case advantage is taken of the projection of a gaseous oxidizing jet in an outward direction from an inner surface of a metal body such as is presented by a bore, cavity, or similar inaccessible recess, the body B throughout its length contacting the wall so as to guide the tip and space the tip from the wall. Although blowpipe bodies B have been made according to the present invention with a diameter of one inch, smaller sizes may be constructed in proportion for light duty and for use in especially restricted areas.

Various modifications of the herein disclosed blowpipe obviously will be suggested to those skilled in the art by the foregoing description, which modifications may be enjoyed without departing from the principles of the invention or sacrificing its advantages.

I claim:

1. In a blowpipe for working in confined spaces such as narrow channels and relatively deep holes, the combination comprising an elongated tubular casing having a portion adapted to be inserted into such spaces; gas conduit means extending through said casing; a head secured adjacent to one end of said portion and having all parts thereof lying within the axially-projected periphery of said portion, said head having a lateral face disposed inwardly from said projected periphery and extending longitudinally of said head, said head also having a cavity extending substantially at right angles to the plane of said face and to the axis of said portion; a tip removably secured in said cavity and lying wholly within said projected periphery, said tip having gas orifice means communicating with said conduit means; an inlet block secured to the end of said portion opposite said head, said block being adapted to be detachably connected to the discharge end of a blowpipe and having passages for supplying said conduits with gas; and cooling fluid connections in said block for admitting and discharging cooling fluid, said casing being provided with passages for circulating cooling fluid between said block and said head.

2. A blowpipe head of metal, such as copper, which is generally cylindrical in cross section, said head having an inwardly offset lateral face substantially parallel to the longitudinal axis thereof, said head also having a substantially longitudinal oxidizing gas passage opposite said face and a nozzle cavity opening vertically into said face and to said oxidizing gas passage, a conical seat disposed in said cavity adjacent said oxidizing gas passage, an annular chamber in said cavity adjacent said conical seat, and a second conical seat on the side of said chamber opposite said first-named conical seat, whereby a relatively short cutting nozzle may be mounted in said cavity with conical seats in gas-tight engagement with said first and second seats in said head, said head also being provided with a single inlet for a combustible mixture of oxygen and acetylene, and a pair of diverging passages connecting said single inlet to opposite sides of said annular chamber for conducting said mixture from said inlet to said chamber, and a U-shaped passage for cooling fluid extending around and spaced from three sides of said chamber.

3. In a blowpipe adapted for use in cavities and other confined places, the combination comprising a blowpipe head; conduit means for delivering cutting oxygen and a combustible preheating mixture to said head from suitable sources of supply; a slender elongated tubular casing extending from said head and surrounding said conduit means; said head being located within the axially-projected periphery of said tubular casing and having a recessed lateral face provided with a cavity adjacent to the end of said blowpipe angularly disposed relative to the axis of said casing; a tip mounted in said cavity, the delivery end of said tip having a cutting oxygen orifice and at least one preheating gas mixture orifice communicating with said respective conduit means, said tip lying wholly within the axially-projected periphery of said casing, whereby said tubular casing substantially throughout its length guides said tip within such cavities, and spaces the delivery end of said tip from the walls of such cavities.

4. In a blowpipe for working in confined spaces such as narrow channels and relatively deep holes, the combination of an elongated slender tubular casing having a portion adapted to be inserted into such spaces; a head secured to said portion of said casing and having no part thereof extending outside the axially-projected periphery of said portion, said head having a lateral face disposed adjacent to and wholly within said projected periphery and a cavity opening into said face and communicating with gas passage means in said head; gas conduit means in said casing communicating with said passage means; a tip removably secured in said cavity at an angle to said elongated casing and lying wholly within said projected periphery, said tip having gas outlet means communicating with said gas passage means; a cooling-fluid duct extending through said head and opening at one end into said casing; and a pipe within said casing communicating with the other end of said duct, thereby to circulate cooling fluid through both said head and said casing.

5. In a blowpipe for working in confined places such as narrow channels and relatively deep holes, the combination comprising an elongated tubular casing having a portion adapted to be inserted into such spaces; gas conduit means extending through said casing; a head secured adjacent to one end of said portion and having all parts of said head lying within the axially-projected periphery of said portion, said head having a lateral face disposed inwardly from said projected periphery, said head also having a cavity adjacent to the end of said blowpipe extending inwardly substantially perpendicularly to the plane of said face and to the axis of said portion; a tip removably secured in said cavity, said tip having gas orifice means communicating with said conduit means; an inlet block secured to the end of said portion opposite said head, said block being adapted to supply said conduit means with gas from a suitable supply source; said tubular casing extending radially beyond the orifice means of said tip, whereby said casing substantially throughout its length guides said tip within said deep holes, and spaces said orifice means from the walls of said holes.

HERBERT W. COWIN.